H. M. GREENER.
BREAD TOASTER.
APPLICATION FILED FEB. 20, 1914.
1,202,059.
Patented Oct. 24, 1916.
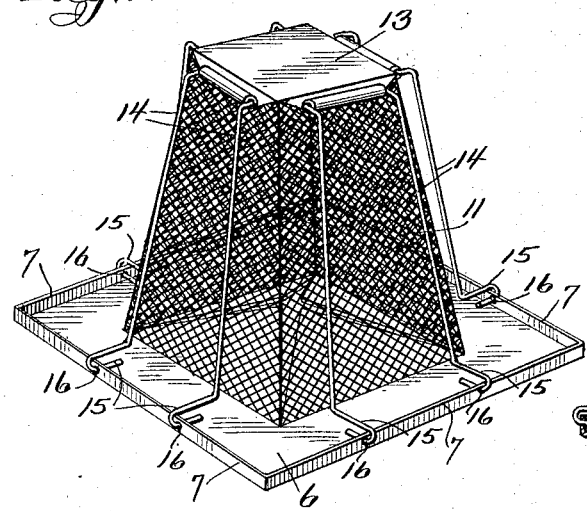
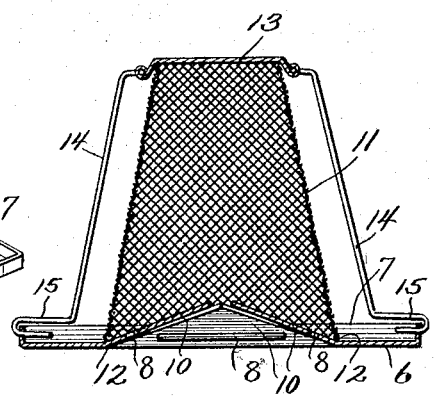
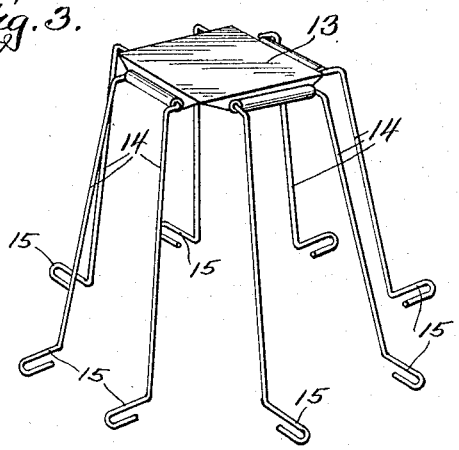
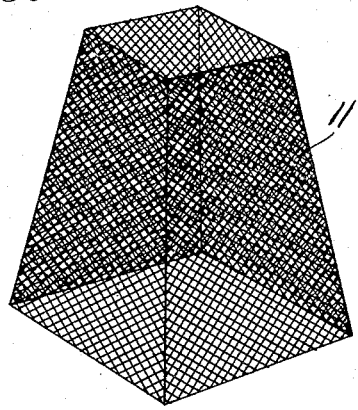
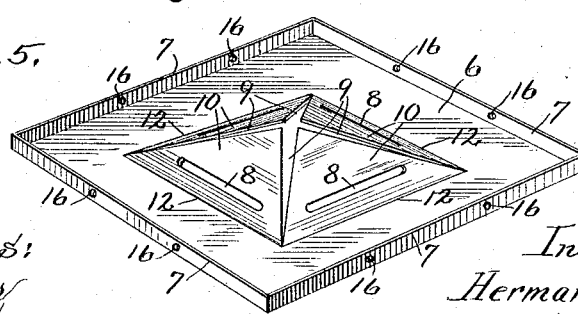
Witnesses:
E. J. Jacker
Watson Hurlburt
Inventor:
Herman M. Greener
By R. J. Jacker
Atty.

UNITED STATES PATENT OFFICE.

HERMAN M. GREENER, OF OAK PARK, ILLINOIS.

BREAD-TOASTER.

1,202,059.  Specification of Letters Patent.  Patented Oct. 24, 1916.

Application filed February 20, 1914. Serial No. 820,085.

*To all whom it may concern:*

Be it known that I, HERMAN M. GREENER, a citizen of the United States, residing at Oak Park, in the county of Cook and State of Illinois, have invented a new and useful Bread-Toaster, of which the following is a specification.

My invention relates to bread toasters which are used on a gas stove or over a gas flame and the objects of my improvements are first, to deflect the heat in such manner as to secure the best results; second, to equalize the intensity of the heat throughout the entire toasting surface; third, to make the several parts of the device detachable so as to facilitate packing and shipping; fourth, to make a cheap, simple, efficient and durable toaster and other features to become apparent from the description to follow.

Heretofore bread toasters of this class have been made in which the heat was unevenly distributed, the parts were rigidly connected together and the results attained were very unsatisfactory and a great deal of care and skill was required in their use. These objectional features are entirely eliminated by the use of my invention which consists of a suitable sheet iron base provided with a novelly arranged slotted center over which is secured a pyramidical screen which is held in place by a sheet metal top tied to the sheet metal base by suitable wires which serve as supports for the bread to be toasted.

To describe my invention so that others versed in the art to which it pertains can make and use the same, I have illustrated it on the accompanying sheet of drawing forming a part of this specification in which:—

Figure 1, is a perspective view of a bread toaster embodying my invention; Fig. 2, is a vertical central section of the same; Fig. 3, is a perspective view of the top with its tie wires detached from the other parts; Fig. 4, is a perspective view of the pyramidical screen detached from the other parts and Fig. 5, is a perspective view of the sheet metal base detached from the other parts.

Similar reference characters refer to similar parts throughout the several views.

The base 6 is made of a square piece of sheet metal having its four edges turned up vertically as seen at 7. The central portion of the base 6 is provided with a plurality of slots 8 and radial slots 9 formed by cutting the V shaped tongues 10. The tongues 10 are bent upward slightly as seen in Fig. 2, to increase the width of the slots 9. A pyramidical screen 11 is set on the center part of the base 6 directly over the four V shaped tongues 10, the angles 12 formed at the junction of the tongues 10 and the base 6 serving to retain the screen in proper position on the base 6. A sheet metal top 13 is made to fit on the upper end of the pyramidical screen 11 and has attached to its four edges the wires 14 which have their lower ends bent into hooks 15 which are hooked into the holes 16 provided in the upturned edges 7 of the base 6. The wires 14 extend from the top of the screen 11 to near its bottom substantially parallel to the oblique sides of the screen. The hook shaped lower ends of the wires 14 serve as supports for the slices of bread while being toasted. The wires 14 are of such length that there is a constant tension downward of the sheet metal top 13 on the screen 11, which tension serves to retain the screen in proper position between the top 13 and the bottom 6.

In operation when the toaster is placed over a flame the heat from same will contact with the sheet metal base 6 and be spread or deflected by the same, so that the V shaped tongues 10 will become highly heated and some of the hot gases will pass up through the slots 8 and 9 and thus heat the screen 11 evenly throughout its entirety. Since the bread resting on the wires 14 is toasted by the heat emitted by the screen 11 the bread will be evenly toasted over its entire surface.

It will be noted that the hooks 15 can easily be forced out of the holes 16 to detach the same from the sheet metal base. In its detached or knocked down condition the toasters in quantities can be densely packed thus saving considerable in handling and shipping.

Having thus fully described my invention what I claim as new and desire to secure by Letters Patent of the United States is:—

1. In a device of the class described, a pyramidical screen tapering from the bottom toward the top, a sheet metal top on said screen provided with downwardly bent edges to prevent the top from shifting with respect to the screen, the extremities of said edges provided with wire holding means, a sheet metal base below said screen provided with a plurality of slots radiating from its center to form a plurality of V shaped tongues, said tongues bent up at angles to the base to form obstructions against which the lower end of said screen rests and is thereby held against shifting with respect to the base, and wires connecting the sheet metal top and the sheet metal base to serve as bread supports and to retain the several parts in an assembled position.

2. In a device of the class described, a pyramidical screen tapering from the bottom toward the top, a sheet metal top on said screen provided with downwardly bent portions against which the top of the screen rests and is prevented from shifting with respect to the sheet metal top, a sheet metal base on said screen provided with a plurality of slots radiating from its center to form a plurality of V shaped tongues, said tongues provided with perforations to permit additional heat to pass up in the screen and bent upwardly at angles to the base to form obstructions against which the lower end of said screen rests and is thereby held against shifting with respect to the base, and wires connecting the sheet metal top and the sheet metal base to serve as bread supports and to retain the several parts in an assembled position.

3. In a device of the class described, a pyramidical screen tapering from the bottom toward the top, a sheet metal top on said screen provided with downwardly bent portions against which the top of the screen rests and is thereby prevented from shifting with respect to the sheet metal top, a sheet metal base below said screen provided with a plurality of slots radiating from its center to form a plurality of integral V shaped tongues, said tongues bent upwardly at angles to the base to form obstructions against which the lower end of the screen rests and is thereby held against shifting with respect to the base, and wires permanently secured to the sheet metal top and detachably secured to the sheet metal base to serve as bread supports and to retain the several parts in an assembled position and permit the disassembling of the parts.

4. In a device of the class described, a pyramidical screen tapering from the bottom toward the top, a sheet metal top on said screen provided with downwardly bent portions against which the top of the screen rests and is thereby prevented from shifting with respect to the sheet metal top, a sheet metal base on said screen provided with a plurality of slots radiating from its center to form a plurality of integral V shaped tongues, said tongues provided with perforations to permit additional heat to pass up into said screen and bent upwardly at angles to the base to form obstructions against which the lower end of the screen rests and is thereby prevented from shifting with respect to the base, and wires permanently secured to the sheet metal top and detachably secured to the sheet metal base to serve as bread supports and to retain the several parts in an assembled position and to permit the disassembling of the parts.

In testimony whereof I have signed my name to this specification in presence of two subscribing witnesses this 31st day of January 1914 at Chicago, Illinois.

HERMAN M. GREENER.

Witnesses:
R. J. JACKER,
WATSON HURLBURT.

Copies of this patent may be obtained for five cents each, by addressing the "Commissioner of Patents, Washington, D. C."